US012265197B2

(12) United States Patent
Kim

(10) Patent No.: US 12,265,197 B2
(45) Date of Patent: Apr. 1, 2025

(54) SENSOR AND LOCKING DEVICE THEREFOR

(71) Applicant: AUTONICS CORPORATION, Busan (KR)

(72) Inventor: Byungyoung Kim, Bucheon-si (KR)

(73) Assignee: AUTONICS CORPORATION, Busan (KR)

( * ) Notice: Subject to any disclaimer, the term of this patent is extended or adjusted under 35 U.S.C. 154(b) by 147 days.

(21) Appl. No.: 18/034,163

(22) PCT Filed: Oct. 26, 2021

(86) PCT No.: PCT/KR2021/015107
§ 371 (c)(1),
(2) Date: Apr. 27, 2023

(87) PCT Pub. No.: WO2022/097983
PCT Pub. Date: May 12, 2022

(65) Prior Publication Data
US 2023/0393301 A1    Dec. 7, 2023

(30) Foreign Application Priority Data

Nov. 3, 2020    (KR) .................. 10-2020-0145247
Apr. 23, 2021    (KR) .................. 10-2021-0052751

(51) Int. Cl.
*G01V 8/20*    (2006.01)
(52) U.S. Cl.
CPC .................... *G01V 8/20* (2013.01)

(58) Field of Classification Search
CPC .............................. E05B 59/00; G01V 8/20
See application file for complete search history.

(56) References Cited

U.S. PATENT DOCUMENTS

2022/0155110 A1    5/2022    Hwang

FOREIGN PATENT DOCUMENTS

| CN | 105421896 A | * | 3/2016 | |
|---|---|---|---|---|
| DE | 102019204304 A1 | * | 10/2019 | ......... E05B 15/0205 |
| JP | 2006-222090 A | | 8/2006 | |
| KR | 20-0452848 Y1 | | 3/2011 | |
| KR | 10-2012-0059907 A | | 6/2012 | |
| KR | 20-2018-0002640 U | | 9/2018 | |
| KR | 10-2020-0114345 A | | 10/2020 | |
| WO | WO-2017014061 A1 | * | 1/2017 | ............. E05B 41/00 |
| WO | WO-2020197114 A1 | * | 10/2020 | ............. G01D 11/24 |

* cited by examiner

*Primary Examiner* — Maurice C Smith
(74) *Attorney, Agent, or Firm* — Birch, Stewart, Kolasch & Birch, LLP

(57) ABSTRACT

A sensor and a locking device therefore are disclosed. The locking device may comprise: a bracket including a first part and a second part bent and extending from the first part; a body coupled to the sensor part to be movable in the longitudinal direction of the second part of the bracket; and a cover pivotally connected to the body, wherein: the cover includes a center plate and a plurality of bridges which extend from the center plate to have a long shape in one direction and include a first bridge extending in the one direction and a second bridge extending in the one direction and spaced apart from the first bridge; the body is positioned between the plurality of bridges; and the plurality of bridges are pivotally connected to the body.

9 Claims, 18 Drawing Sheets

SENSOR AND LOCKING DEVICE THEREFOR

CROSS REFERENCE TO RELATED APPLICATIONS

This application is the National Phase of PCT/KR2021/015107 filed on Oct. 26, 2021, which claims priority under 35 U.S.C. § 119 (a) to Patent Application No. 10-2020-014524,7 filed in the Republic of Korea on Nov. 3, 2020, and Patent Application No. 10-2021-0052751, filed in the Republic of Korea on Apr. 23, 2021, all of which are hereby expressly incorporated by reference into the present application.

TECHNICAL FIELD

The following description relates to a sensor, and more particularly to a locking device for a multi-optical axis sensor capable of detecting a predetermined area.

BACKGROUND ART

A multi-optical axis sensor is a sensor for detecting a specific area by using a plurality of light sources. The multi-optical axis sensor may be used in various applications including entrances, elevators, moving walkways, escalators, and the like. That is, the multi-optical axis sensor may detect the presence of an individual or object in a specific area, and the sensor may be widely used in places where the function is required.

The multi-optical axis sensor may be used in a workplace, such as manufacturing facilities and the like. The workplace may be a space in which automated instruments are installed. The automated instruments may require maintenance periodically or in case of abnormal operation. When a worker enters a workplace for maintenance of automated instruments installed in the workplace, the operation of the multi-optical axis sensor may be stopped. In this case, a locking device for the multi-optical axis sensor may be required in order to stop the operation of the multi-optical axis sensor until the worker completely finishes the maintenance work. For example, a safety system may be required, in which if a worker enters a dangerous area and light is blocked in a sensor, the sensor transmits a light-blocking signal to a controller, and the controller stops the operation of mechanical equipment in response to the light-blocking signal.

Recently, research for securing work safety in a sensor installation environment is being actively conducted.

DISCLOSURE OF INVENTION

Technical Problem

It is an objective of the present disclosure to solve the above and other problems. It is another objective of the present disclosure to provide a locking device for a sensor in order to prevent malfunction of the sensor.

It is another objective of the present disclosure to provide a locking device for a sensor in which a cover of the locking device may be stably fixed in position.

It is another objective of the present disclosure to provide a locking device for a sensor in which the locking device may be integrally coupled to the sensor.

It is another objective of the present disclosure to provide a locking device for a sensor in which when the locking device covers an optical path of the sensor, light to be incident on the sensor is blocked, and it is determined that a worker enters a dangerous area, such that the operation of mechanical equipment, such as robots, conveyor belts, etc., in the dangerous area may be stopped.

Technical Solution

In order to achieve the above and other objectives, there is provided a locking device including: a bracket including a first part and a second part bent and extending from the first part; a body coupled to the second part so as to be movable in a longitudinal direction of the second part of the bracket; and a cover pivotally connected to the body, wherein the cover includes: a center plate; and a plurality of bridges which are elongated from the center plate in one direction and include a first bridge extending in the one direction and a second bridge extending in the one direction and spaced apart from the first bridge, wherein the plurality of bridges are pivotally connected to the body.

Advantageous Effects of Invention

A sensor and a locking device therefor according to the embodiments of the present disclosure have the following effects.

According to at least one of the embodiments of the present disclosure, a locking device for a sensor may be provided in which malfunction of the sensor may be prevented.

According to at least one of the embodiments of the present disclosure, a locking device for a sensor may be provided in which a cover of the locking device may be stably fixed in position.

According to at least one of the embodiments of the present disclosure, a locking device for a sensor may be provided in which the locking device may be integrally coupled to the sensor.

According to at least one of the embodiments of the present disclosure, when the locking device covers an optical path of the sensor, light to be incident on the sensor is blocked, and it is determined that a worker enters a dangerous area, such that the operation of mechanical equipment, such as robots, conveyor belts, etc., in the dangerous area may be stopped.

MODE FOR THE INVENTION

Figure 1:
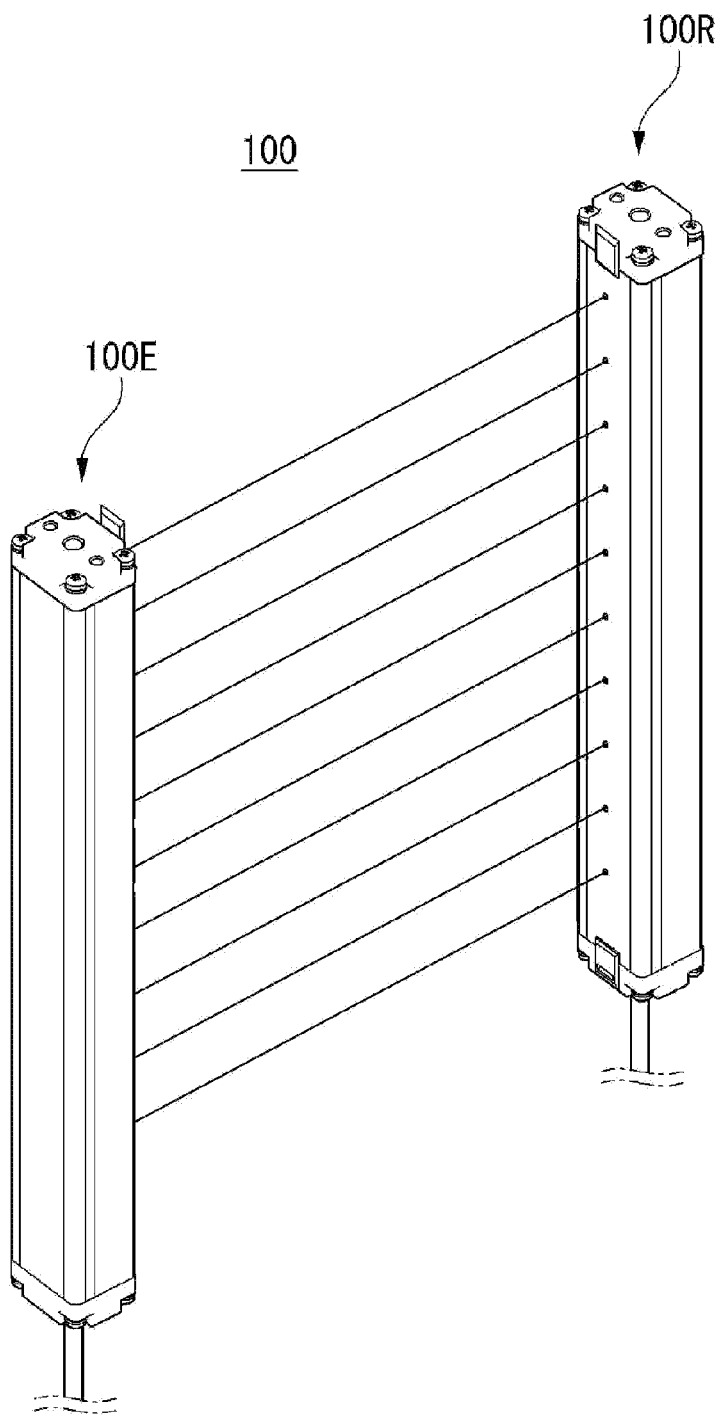
FIGS. 1 to 18 are diagrams illustrating examples of a sensor and a locking device therefor according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The terms "module" and "unit" for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the invention.

Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

A sensor 100 may be referred to as a multi-optical axis sensor 100. For example, the multi-optical axis sensor 100 may be referred to as an area sensor 100 given that the multi-optical axis sensor 100 detects a predetermined area.

Referring to FIG. 1, the multi-optical axis sensor 100 may include an emitter 100E and a receiver 100R. The emitter 100E may face the receiver 100R. The emitter 100E may emit light. The emitter 100E may include a light emitting element. The emitter 100 may be referred to as a light emitting unit 100E or a light projector 100E. The emitter 100E may include a plurality of light emitting elements. The plurality of light emitting elements may be sequentially or serially arranged on one surface of the emitter 100E.

The receiver 100R may detect light. The receiver 100R may include a light receiving element. The receiver 100R may be referred to as a light receiving unit 100R or an optical receiver 100R. The receiver 100R may include a plurality of light receiving elements. The plurality of light receiving elements may be sequentially or serially arranged on one surface of the receiver 100R.

The light provided by the emitter 100E may be detected by the receiver 100R. If an individual or an object is located between the emitter 100E and the receiver 100R, a portion of the light provided by the emitter 100E is blocked, thereby detecting the presence or absence of the individual or object in a detection area.

Figure 2:
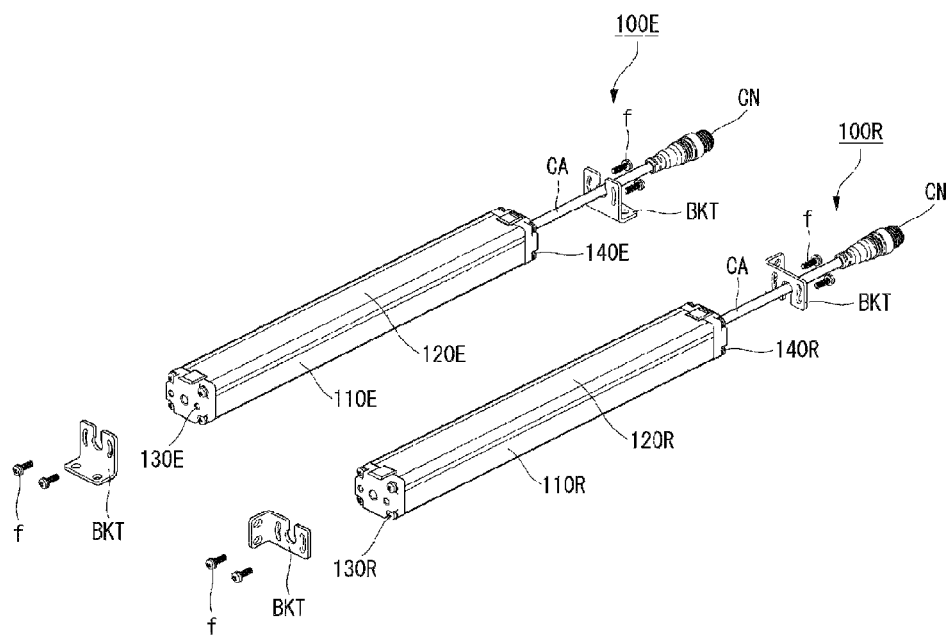

Referring to FIG. 2, the emitter 100E may include a housing 110E, a light emitter 120E, and caps 130E and 140E. The housing 110E may be elongated and may have a receiving space therein. The light emitter 120E may be formed on one surface of the housing 110E. The light emitter 120E may be elongated on one surface or one side of the housing 110E in a longitudinal direction of the housing 110E. The caps 130E and 140E may be mounted at one end or/and another end of the housing 110E. For example, the light emitter 120E and the housing 110E may be coupled to each other by the caps 130E and 140E.

The emitter 100E may include a cable CA. The cable CA may be electrically connected to the light emitter 120E. On one side of the housing 110E or the cap 140E, the cable CA may be connected to an external source. One side of the cable CA may be electrically connected to the light emitter 120E and another side of the cable CA may be connected to a connector CN. Accordingly, the emitter 100E may receive power or a control signal from an external source.

The emitter 100E may include a bracket BKT. The bracket BKT may be mounted at one or both ends of the emitter 100E or may be coupled thereto. The bracket BKT may be provided to install or mount the emitter 100E in predetermined equipment. The bracket BKT may be mounted to the emitter 100E by a coupling member f.

The receiver 100R may include a housing 110R, a light receiver 120R, and caps 130R and 140R. The receiver 100R may include a cable CA and a bracket BKT. The above description of the emitter 100E and components thereof may also apply to the housing 110R, the caps 130R and 140R, the cable CA, and/or the bracket BKT. In FIG. 2, the above description of the light emitter 120E may also apply to the light receiver 120R.

In the following description, the emitter 100E and the receiver 100R will not be distinguished from each other, but will be collectively referred to as the sensor 100.

Figure 3:
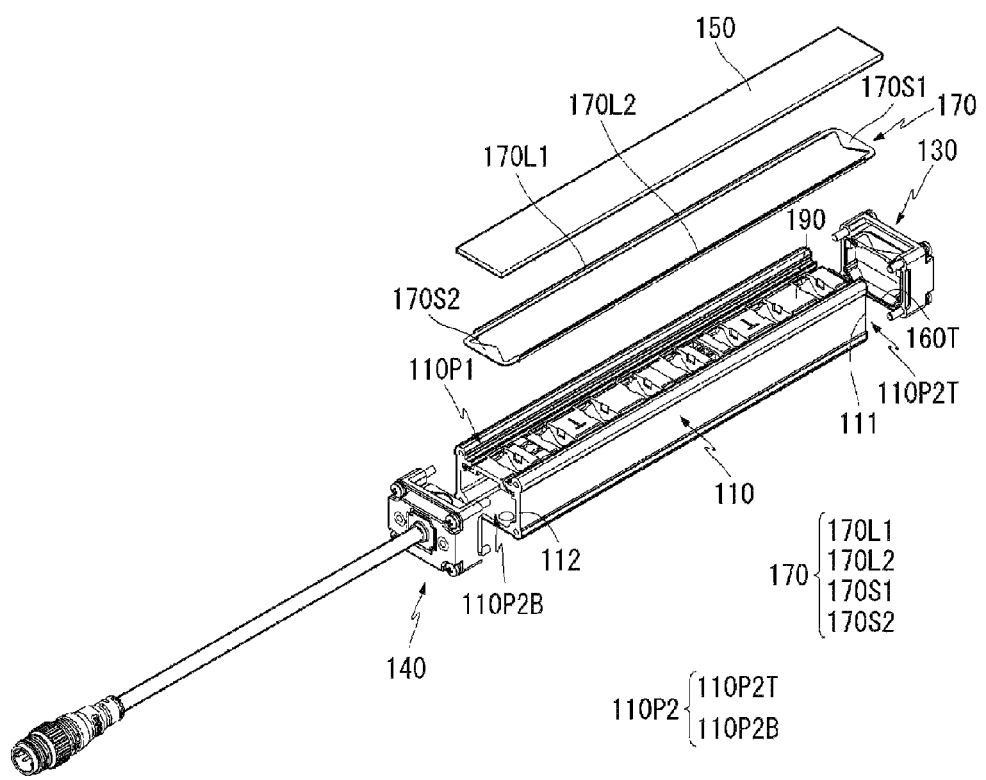

Referring to FIG. 3, the housing 110 may be elongated and may be hollow to provide a receiving space. For example, the housing 110 may be formed in the shape of a long cylinder or rectangular pillar. The housing 110 may have an opening 110P1 elongated on one side of the housing 110 in a longitudinal direction thereof. The opening 110P1 may be referred to as a first opening 110P1. The housing 110 may have an opening 110P2 or openings 110P2 at one or both ends thereof. The opening 110P2 or the openings 110P2 may be referred to as a second opening 110P2 or second openings 110P2. The openings 110P2 may include an upper opening 110P2T and a lower opening 110P2B. The first opening 110P1 may be connected to the second opening 110P2.

A light emitting element and/or a light receiving element may be mounted in the receiving space of the housing 110. A sensing module 190 may include the light emitting element and/or the light receiving element.

A cap 130 may block the upper opening 110P2T formed at an upper end of the housing 110. In addition, a cap 140 may block the lower opening 110P2B formed at a lower end of the housing 110. Both ends of the housing 110 may have the same structure.

A sealing member 160T may be disposed between the cap 130 and one end of the housing 110. The sealing member 160T may be disposed around a periphery of the upper opening 110P2T of the housing 110. The sealing member 160 may be referred to as a first sealing member 160T. The first sealing member 160T may be referred to as an upper sealing member 160T.

A cover 150 may have an elongated flat plate shape and may cover the first opening 110P1. The cover 150 may be referred to as a front cover 150 or a transparent cover 150.

A sealing member 170 may be disposed between the housing 110 and the cover 150. The sealing member 170 may be referred to as a second sealing member 170. The second sealing member may be referred to as a front sealing member 170.

Figure 4:
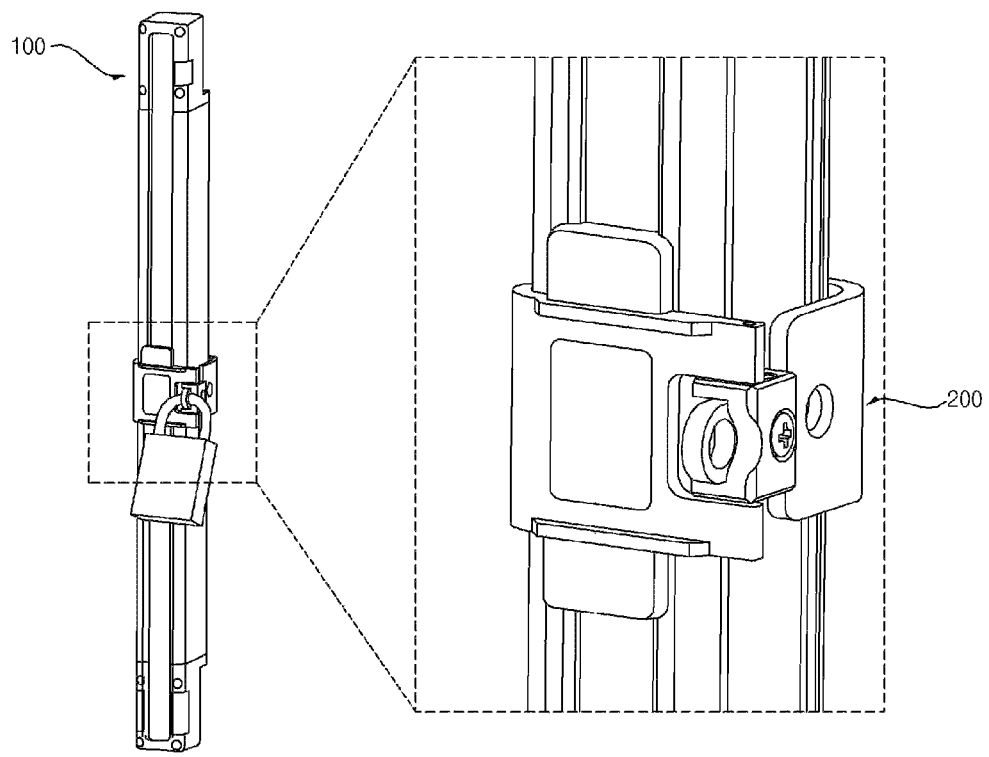
Figure 5:
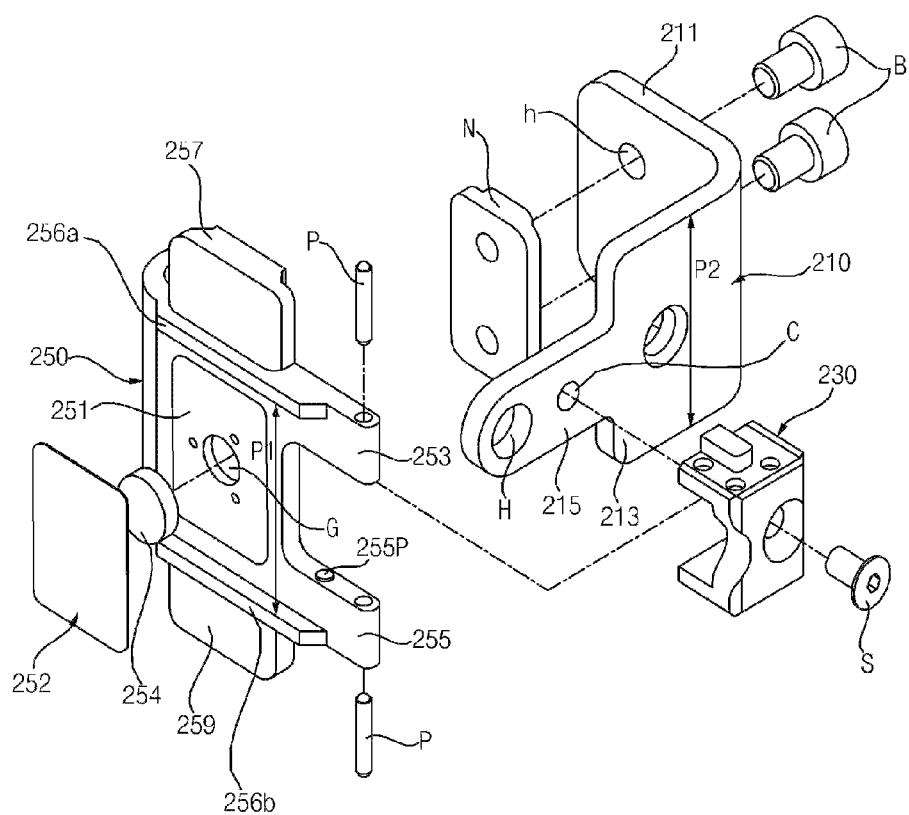

Referring to FIGS. 4 and 5, a sensor safety device 200 may be mounted to the sensor 100. The sensor safety device 200 may be installed on the outside of the sensor 100 while covering an outer surface of the sensor 100.

A bracket 210 may be bent. The bracket 210 may include a first part 211, a second part 213, and a third part 215. The second part 213 and may be bent and extend from the first part 211. For example, the second part 213 may form an angle of 90 degrees with respect to the first part 211.

The second part 213 may be bent by being rounded from the first part 211. The third part 215 may extend from the second part 213. A width of the third part 215 may be smaller than a width of the second part 213. The second part 213 may be disposed between the first part 211 and the third part 215.

Coupling holes h may be formed in the first part 211. Bolts B and nuts N may be coupled to each other through the coupling holes h. The coupling holes h may be formed in the second part 213, and the first part 211 may be omitted. A locking hole H may be formed at a position adjacent to an end of the third part 215. A fixing hole C may be formed in the third part 215 or the second part 213. The fixing hole C may be disposed between the locking hole H and the first part 211. A body 230 may be coupled to the bracket 210. The body 230 may be fixed to the fixing hole C by a screw S. The body 230 may be integrally formed with the bracket 210. In this case, the body 230 may be integrally formed with the second part 213 or the third part 215.

A cover 250 may be pivotally coupled or connected to the body 230. The cover 250 may have a generally plate shape. The cover 250 may include a center plate 251, wing plates 257 and 259, and bridges 253 and 255. A recess G may be formed in an outer surface of the center plate 251.

A magnet 254 may be inserted into the recess G of the center plate 251 to be fixed thereto. The magnet 254 and/or the recess G may be positioned within a range of a width P2 of the second part 213. Accordingly, when the cover 250 is fully opened by rotating about the body 230, the cover 250 may be fixed to the second part 213 by a magnetic force.

A cover plate 252 may cover a front surface of the center plate 251 and the magnet 254. A length or width of the cover plate 250 may be greater than a size of the magnet 254 or a width of the second part 213. For example, the cover plate 252 may include metal. Accordingly, the magnetic force generated by the magnet 254 acts through the cover plate 252 so that the cover 250 and the second part 213 may be firmly coupled to each other.

The wing plates 257 and 259 may extend from the top and/or bottom of the center plate 251. Accordingly, a light-blocking range of the cover 250 may be improved. The bridges 253 and 255 may extend to the left or right side of the center plate 251. For example, the wing plates 257 and 259 and the bridges 253 and 255 may form a right angle with each other.

The body 230 may be disposed between the bridges 253 and 255, and the cover 250 may be coupled to the body 230 by a pin P passing through the bridges 253 and 255. The cover 250 may pivot or rotate about the pin P as an axis.

A plurality of ribs 256a and 256b may be formed on a front surface of the cover 250. A first rib 256a may be adjacent to an upper side of the center plate 251 and may be elongated along the upper side, and a second rib 256b may be adjacent to a lower side of the center plate 251 and may be elongated along the lower side. The first rib 256a may be parallel to the second rib 256b. A distance P1 between the first rib 256a and the second rib 256n may be substantially equal to a distance P2 between an upper side and a lower side of the second part 213 of the bracket 210. Accordingly, the cover 250 rotates about the body 230 so that the bracket 210 may be inserted into the ribs 256a and 256b of the cover 250 to be fixed in position.

Figure 6:
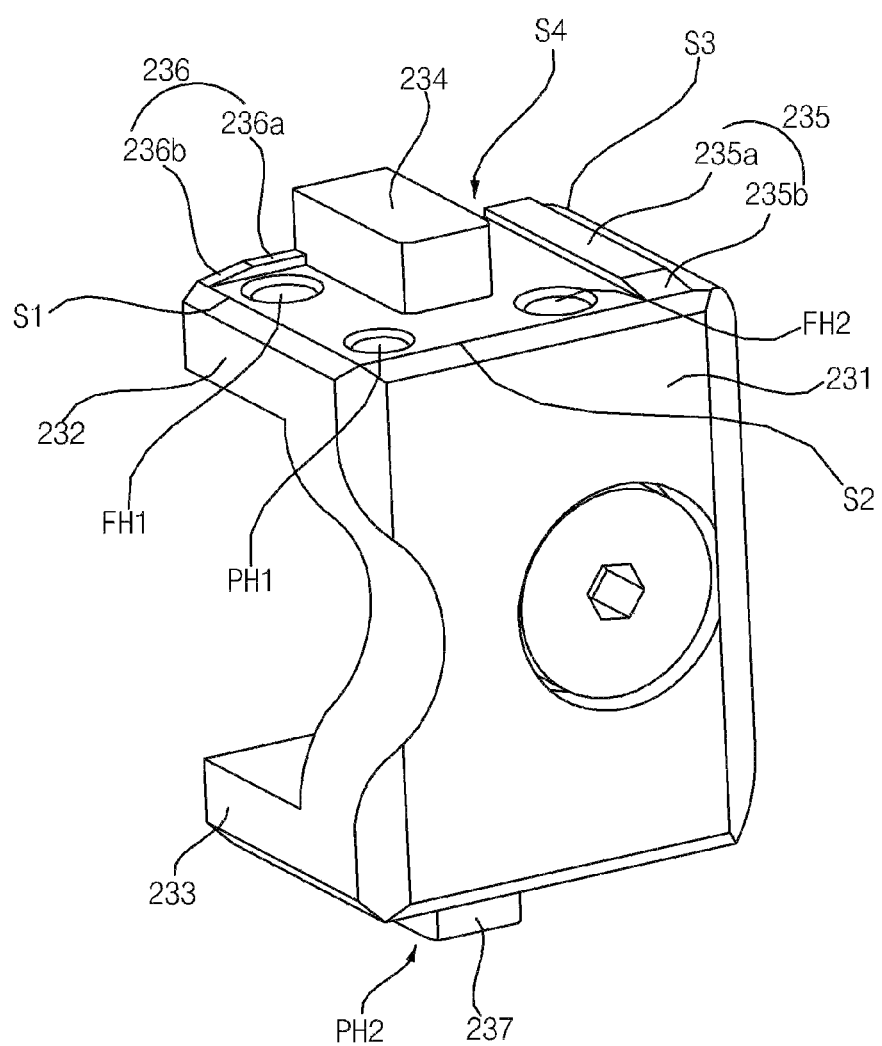
Figure 7:
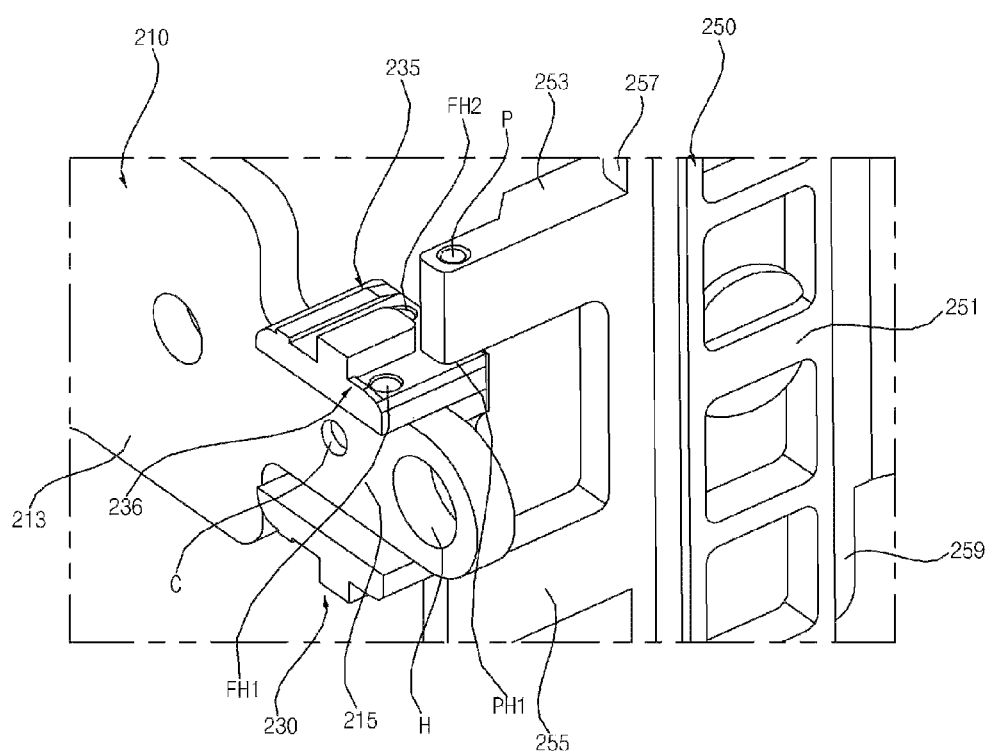
Figure 8:
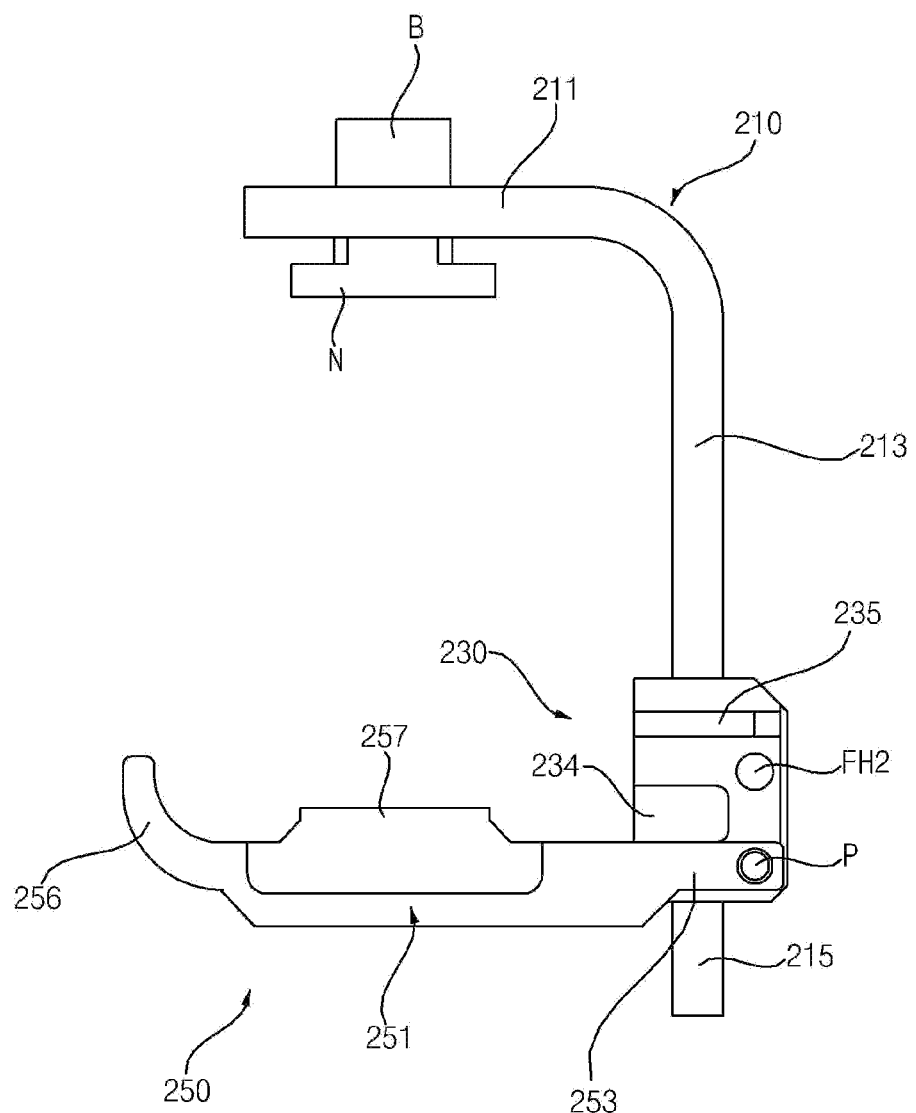
Figure 9:
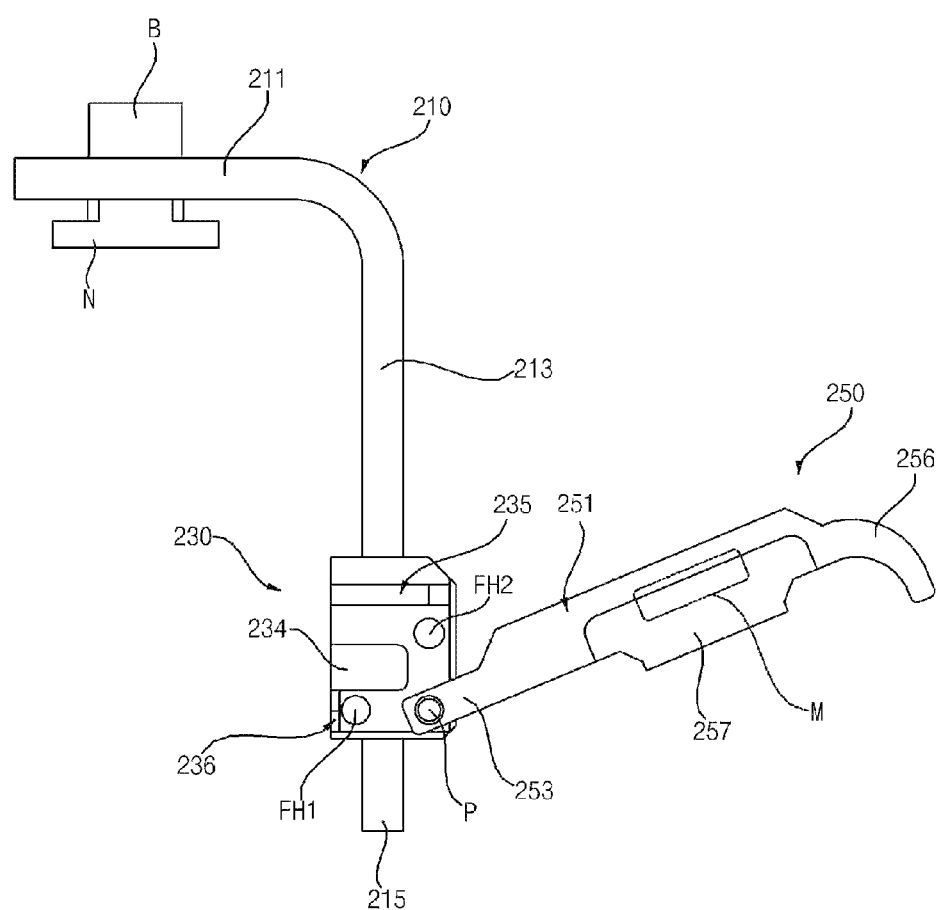

Referring to FIG. 6, the body 230 may include a first part 231, a second part 232, and a third part 233. The first part 231 may form a vertical wall. The second part 232 may be fixed to an upper end of the first part 231 and may form a horizontal floor. The third part 233 may be fixed to a lower end of the first part 231 and may form a horizontal floor. The third part 233 may face the second part 232 with respect to the first part 231.

A first stopper 234 may be disposed on the second part 232. The first stopper 232 may protrude from a top surface of the second part 232. The first stopper 234 may be in the shape of a rectangular pillar or a cylinder. The second stopper 237 may be disposed on the third part 233. The second stopper 237 may protrude from a bottom surface of the third part 233. The second stopper 237 may be in the shape of a rectangular pillar or a cylinder. The second stopper 237 may be opposite or symmetrical to the first stopper 234 with respect to the first part 231.

A first pin hole PH1 may be formed in the top surface of the second part 232. The first pin hole PH1 may be disposed at a position adjacent to one corner of the stopper 234. A first fixing hole FH1 may be disposed adjacent to a first side S1 of the second part 232, and a second fixing hole FH2 may be disposed adjacent to a second side S2 of the second part 232. The first side S1 and the second side S2 may be connected to each other. A corner formed between the first side S1 and the second side S2 may correspond to one corner of the stopper 234. For example, the first fixing hole FH1 may be disposed to form a right angle with the second fixing hole FH2 with respect to the first pin hole PH1. A second pin hole PH2 may be formed in the bottom surface of the third part 233. The second pin hole PH2 may be opposite or symmetrical to the first pin hole PH1 with respect to the first part 231.

A first rail 235 may extend parallel to a third side S3 of the second part 232 and may be formed on the second part 232 at a position adjacent to the third side S3 of the second part 232. The first rail 235 may have an inclined portion 235b and a flat portion 235a. The inclined portion 235b may be closer to the second side S2 of the second part 232 than the flat portion 235a, and the flat portion 235a may be closer to a fourth side S4 of the second part 232 than the inclined portion 235b. The inclined portion 235b may be connected to the flat portion 235a.

A second rail 236 may extend parallel to the fourth side S4 of the second part 232 and may be formed on the second part 232 at a position adjacent to the fourth side S4 of the second part 236. The second rail 236 may have an inclined portion 236b and a flat portion 236a. The inclined portion 236b may be closer to the first side S1 of the second part 232 than the flat portion 236a, and the flat portion 236a may be closer to the fourth side S4 of the second part 232 than the inclined portion 236b. The inclined portion 236b may be connected to the flat portion 236a.

Referring to FIGS. 7 to 11, the cover 250 may be pivotally or rotatably coupled to the body 230. The cover 250 may be coupled to the body 230 by inserting the pin P into the pin hole PH1. The cover 250 may include a curved wall 256 for covering the multi-optical axis sensor 100. The curved wall 256 may extend from an end of the center plate 251 of the cover 250.

The cover 250 may rotate or pivot about an axis of the pin P. When the cover 250 faces the first part 211 of the bracket 210 (see FIG. 8), the cover 250 may be disposed over the first fixing hole FH1, and the bridge 253 of the cover 250 may contact the second rail 236. While moving up the inclined portion 236b of the second rail 236, the bridge 253 of the cover 250 may slide on the flat portion 236a.

The cover 250 may include a fixing protrusion 253P (see FIG. 11) protruding from the bridge 253 at a position between the bridge 253 and the body 230. The fixing protrusion 253P may be inserted into the first fixing hole FH1. This state may be referred to as a state in which the locking device 200 covers or blocks an optical path of the sensor 110 or a state in which the locking device 200 closes the sensor 100.

Accordingly, the cover 250 may be fixed at a position where the cover 250 faces the first part 211 of the bracket 210.

Figure 10:
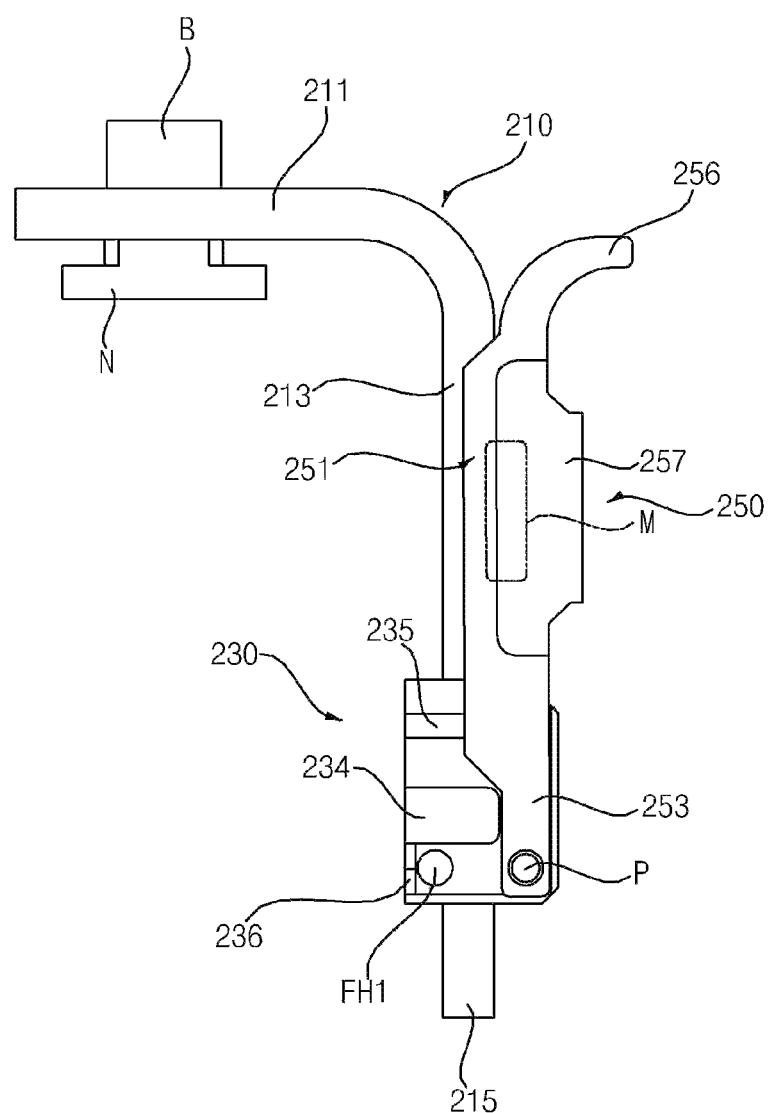
Figure 11:
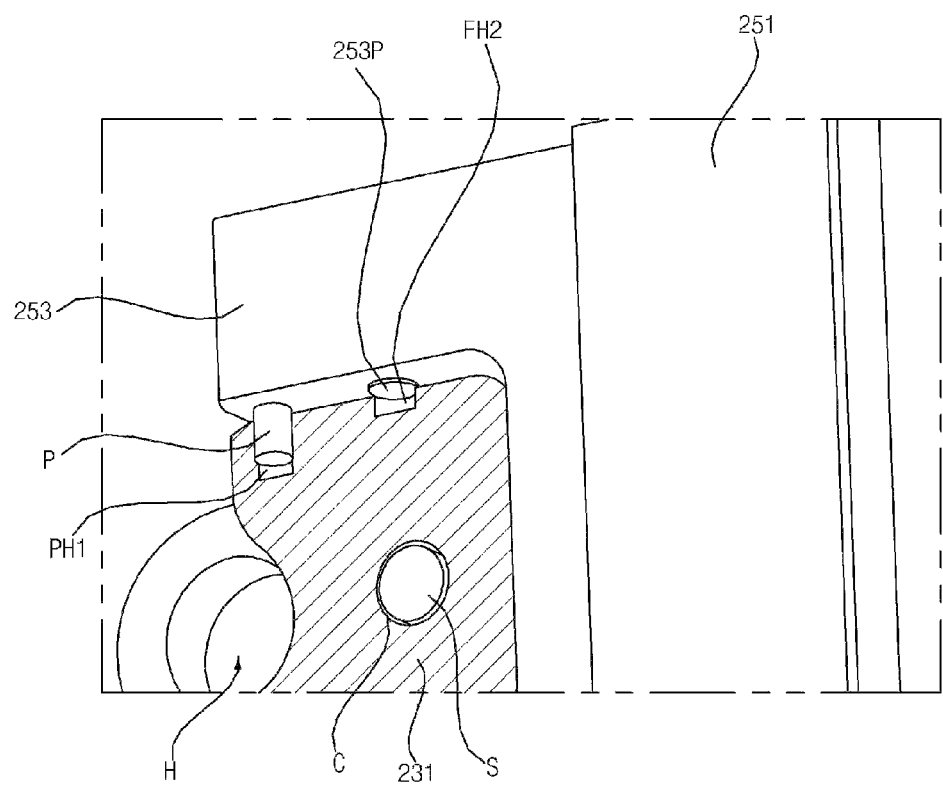

When the cover 250 rotates about the pin P (see FIG. 9), the cover 250 may face the second part 213 of the bracket 210 (see FIG. 10). While moving up the inclined portion 235b of the first rail 235, the bridge 253 of the cover 250 may slide on the flat portion 235a. The fixing protrusion 253P may be inserted into the second fixing hole FH2. A magnet M may be coupled to the second part 213 of the bracket 210 by a magnetic force. That is, in an open state (state illustrated in FIG. 10), the cover 250 may be fixed to the bracket 210 by the magnetic force generated by the magnet M 254. Accordingly, work convenience may be improved. This state may be referred to as a state in which the locking device 200 opens an optical path of the sensor 110 or a state in which the locking device 200 opens the sensor 100.

Accordingly, the cover 250 may be firmly fixed at a position where the cover 250 faces the second part 213 of the bracket 210.

Figure 12:
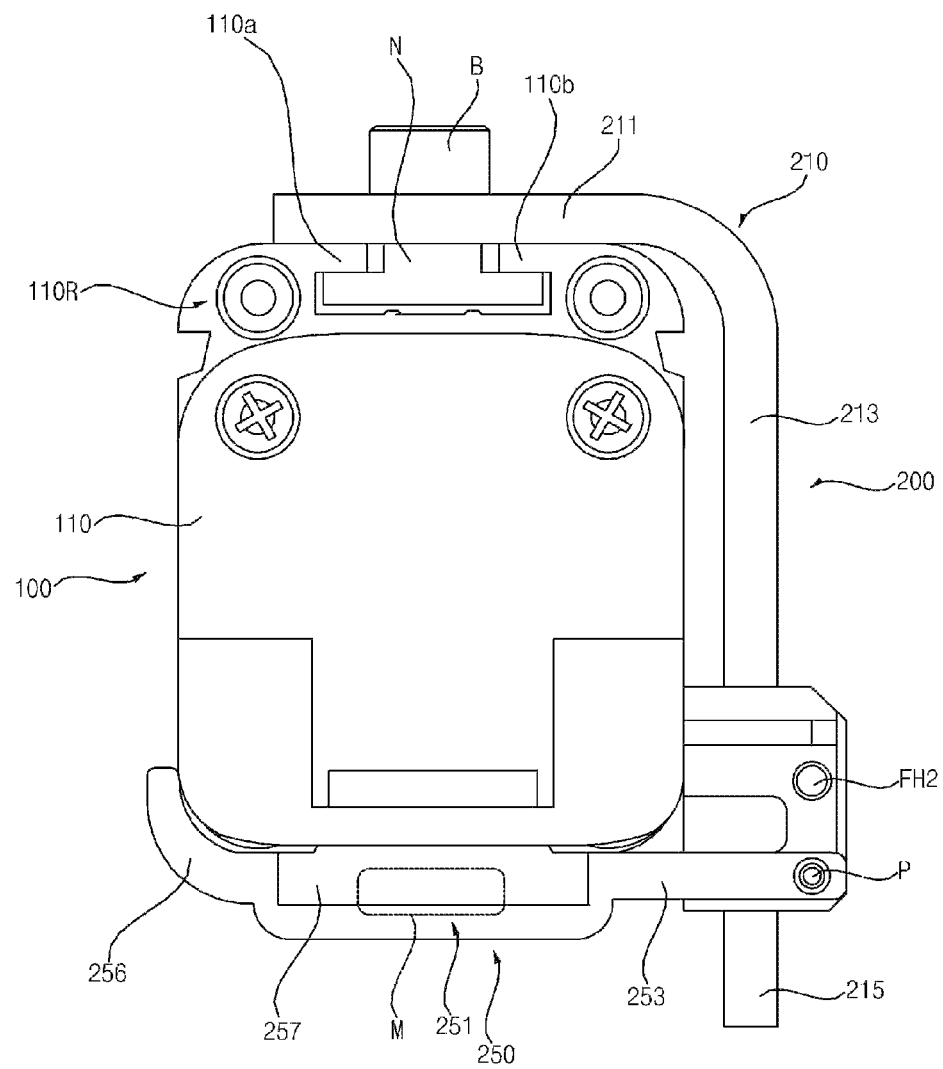

Referring to FIG. 12, the locking device 200 may be coupled to the sensor 100. The sensor 100 may include a coupling rail 110R on a rear surface of the housing 110. The coupling rail 110R may also be formed on a side surface of the housing 110. The coupling rail 110R may have a generally C-shape. The nut N have a generally T-shape. The coupling rail 110R may include holders 110a and 110b facing each other. The holders 110a and 110b may be inserted between the nut N and the first part 211 of the bracket 210. When the coupling rail 110R is formed on the side surface of the housing 110, the holders 110a and 110b may be inserted between the nut N and the second part 213 of the bracket 210.

The cover 250 of the locking device 200 may cover the transparent cover 150 (see FIG. 3) of the sensor 100. The cover 250 may cover and wrap the housing 110 and/or the transparent cover 150 of the sensor 100. The curved wall 256 may cover the side surface of the housing 110 at the front thereof. The wing plate 257 may protrude toward the transparent cover 150. When the cover 250 covers the transparent cover 150, the wing plate 257 may contact the transparent cover 150.

When the cover 250 of the locking device 200 covers the transparent cover 150 of the sensor 100, light incident from the light emitter on the light receiver of the sensor 100 is blocked, and it is determined that a worker enters a dangerous area, such that the operation of mechanical equipment, such as robots, conveyor belts, etc., in the dangerous area may be stopped.

Figure 13:
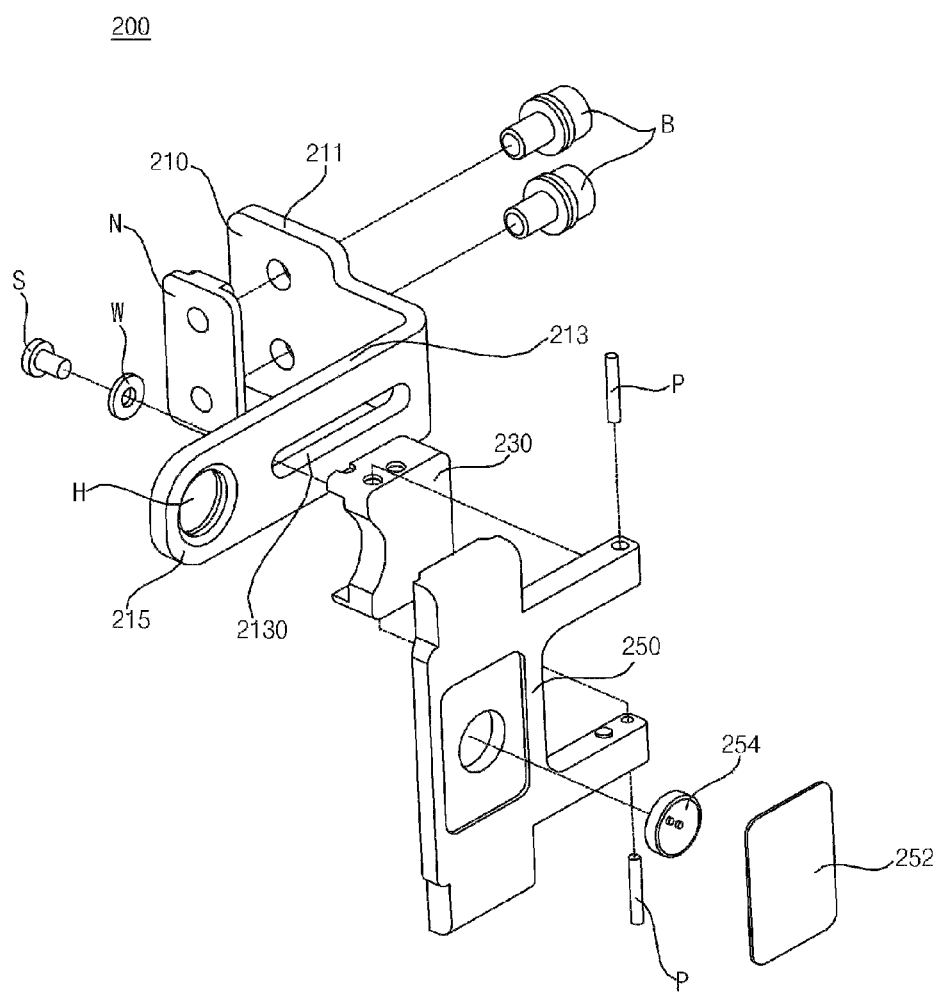
Figure 14:
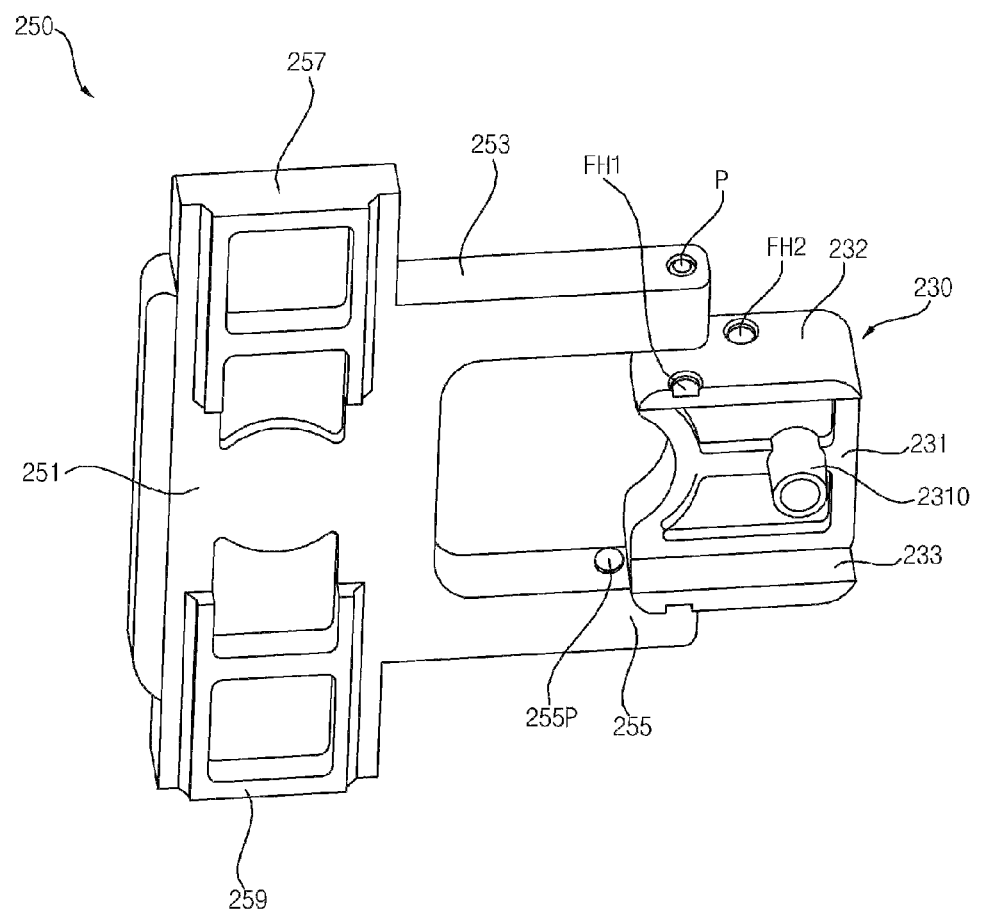

Referring to FIGS. 13 and 14, the bracket 210 may be bent. The bracket 210 may include the first part 211, the second part 213, and the third part 215. The second part 213 may be bent and extend from the first part 211. For example, the second part 213 may form an angle of 90 degrees with respect to the first part 211.

The second part 213 may be bent by being rounded from the first part 211. The third part 215 may extend from the second part 213. A width of the third part 215 may be substantially equal to a width of the second part 213. The second part 213 may be disposed between the first part 211 and the third part 215.

The bolts B and nuts N may be coupled to the first part 211 through coupling holes. The coupling holes may be formed in the second part 213, and the first part 211 may be omitted. The locking hole H may be formed adjacent to an end of the third part 215.

A sliding slot 2130 may be formed in the second part 213 of the bracket 210. The second part 213 may be bent from the first part 211 to be elongated. The third part 215 may be formed at an end of the second part 213, and the locking hole H may be formed in the third part 215. The sliding slot 2130 may be elongated between the locking hole H and the first part 211 and may be formed through the second part 213. The sliding slot 2130 may be referred to as a guide slot 2130.

The body 230 may include a slider 2310. The slider 2310 may be referred to as a stopper 2310 or a guide protrusion 2310. The slider 2310 may protrude from one surface of the body 230. The slider 2310 may protrude or extend from one surface of the first part 231. The slider 2310 may be disposed between the second part 232 and the third part 233. The slider 2310 may be inserted into the sliding slot 2130 of the bracket 210. The body 230 may move from the first part 211 of the bracket 210 toward the third part 215 thereof, and may move from the third part 215 toward the first part 211. The sliding slot 2130 may limit a movement range of the body 230.

The cover 250 may be pivotally coupled or connected to the body 230. The cover 250 may have a generally plate shape. The cover 250 may include the center plate 251, the wing plates 257 and 259, and the bridges 253 and 255. A recess may be formed in an outer surface of the center plate 251.

The magnet 254 may be inserted into the recess of the center plate 251 to be fixed thereto. The magnet 254 and/or the recess may be positioned between the bridges 253 and 255. The magnet 254 and/or the recess may be positioned within a range of the width of the second part 213. For example, a position of the magnet 254 may correspond to the sliding slot 2130 or the locking hole H. Accordingly, while the cover 252 is fixed to or in contact with the second part 213 of the bracket 210 by a magnetic force, the body 230 may move in the sliding slot 2130. When the cover 250 is fully opened by rotating about the body 230, the cover 250 may be fixed to the second part 213 by the magnetic force.

The cover plate 252 may cover a front surface of the center plate 251 and the magnet 254. A size of the cover plate 252 may be greater than a size of the magnet 254 and may be smaller than a size of the center plate 251. For example, a distance between an upper side and a lower side of the cover plate 252 may correspond to the width of the second part 231 of the bracket 210. The cover plate 252 may include metal. Accordingly, the magnetic force generated by the magnet 254 acts through the cover plate 252 so that the cover 250 and the second part 213 may be firmly coupled to each other. In other words, as the magnet 254 is disposed at a position corresponding to the sliding slot 2130 and/or the locking hole H, a coupling force between the magnet 254 and the second part 213 of the bracket 210 may decrease. The coupling force may increase as the cover plate 252 allows for a wider range of magnetic force.

The wing plates 257 and 259 may extend from the top and/or bottom of the center plate 251. Accordingly, a light-blocking range of the cover 250 may be improved. The bridges 253 and 255 may extend to the left or right side of the center plate 251. For example, the wing plates 257 and 259 and the bridges 253 and 255 may form a right angle with each other.

The body 230 may be disposed between the bridges 253 and 255, and the cover 250 may be coupled to the body 230 by the pin P passing through the bridges 253 and 255. The cover 250 may pivot or rotate about the pin P as an axis.

Figure 15:
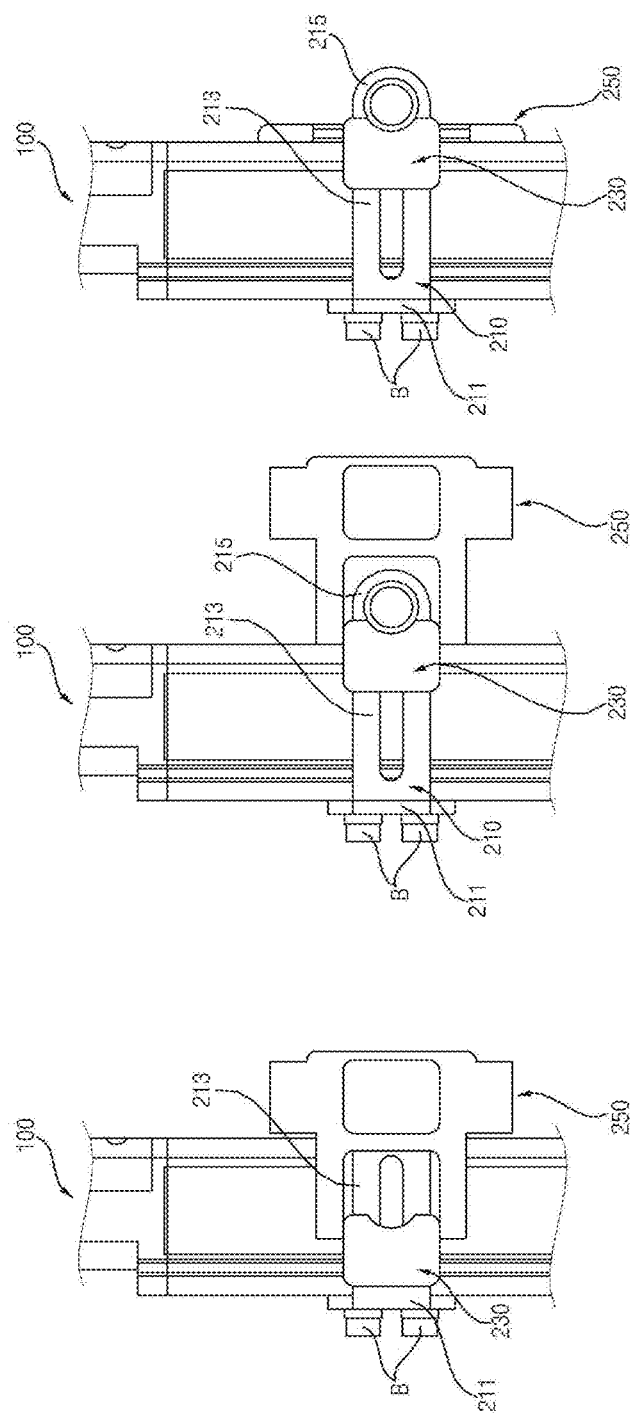

Referring to FIG. 15, the body 230 may move on the bracket 210. The body 230 may move in a longitudinal direction of the second part 213 of the bracket 210. The body 230 may move on a predetermined section of the bracket 210. A movement range of the body 230 may be limited by a length of the slot 2130 (see FIG. 13). While the body 230 moves on the bracket 210, the cover 250 may remain unrotated on the body 230. This may be a state in which the locking device 200 opens the sensor 100.

When the body 230 is close to the first part 211 of the bracket 210, the cover 250 may be parallel to the second part 213 of the bracket 210. In this case, the cover 250 may be coupled to or in contact with the second part 213 of the bracket 210 by a magnetic force. The body 230 may move from front to rear or from left to right on the bracket 250. While the body 230 moves on the bracket 210, the cover 250 may remain coupled to or in contact with the second part 213 of the bracket 210. When the body 230 moves on the bracket 250 and the body 230 moves closer to the third part 215 of the bracket 210, the cover 250 may rotate about the body 230 to be disposed parallel to the first part 211 of the bracket 210. That is, when the body 230 moves closer to the third part 215 of the bracket 210, the cover 250 may rotate about the body 230.

The cover 250 may rotate about the body 230 as an axis in a clockwise direction and/or counterclockwise direction. The cover 250 may rotate about the body as an axis in both directions. For example, when the body 230 moves closer to the third part 215, the cover 250 may rotate 90 degrees in the counterclockwise direction to cover the front surface of the sensor 100. This may be a state in which the locking device 200 closes the sensor 100.

Accordingly, even when the sensor 100 is installed in a narrow space, the cover 250 may be easily operated.

Figure 16:
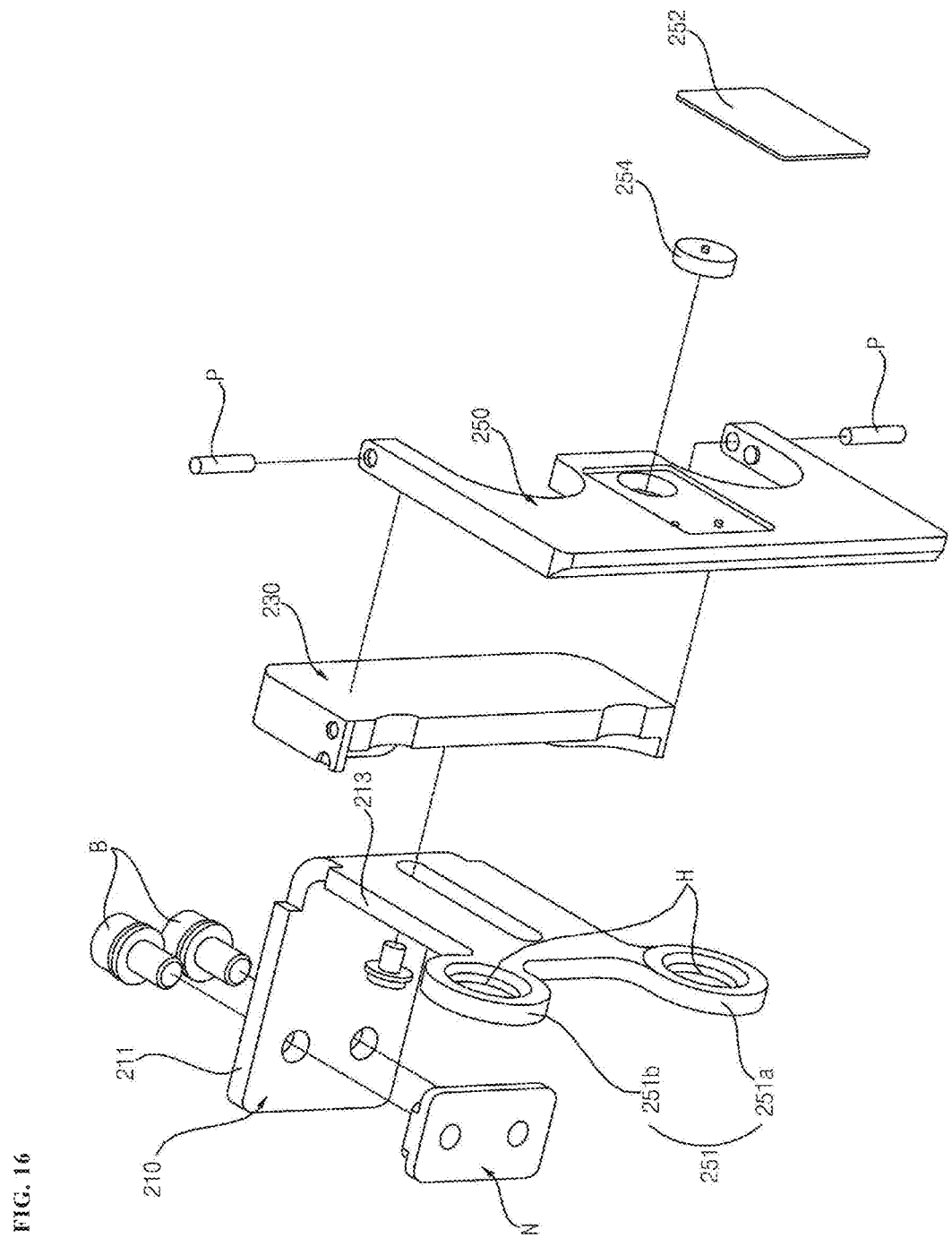
Figure 17:
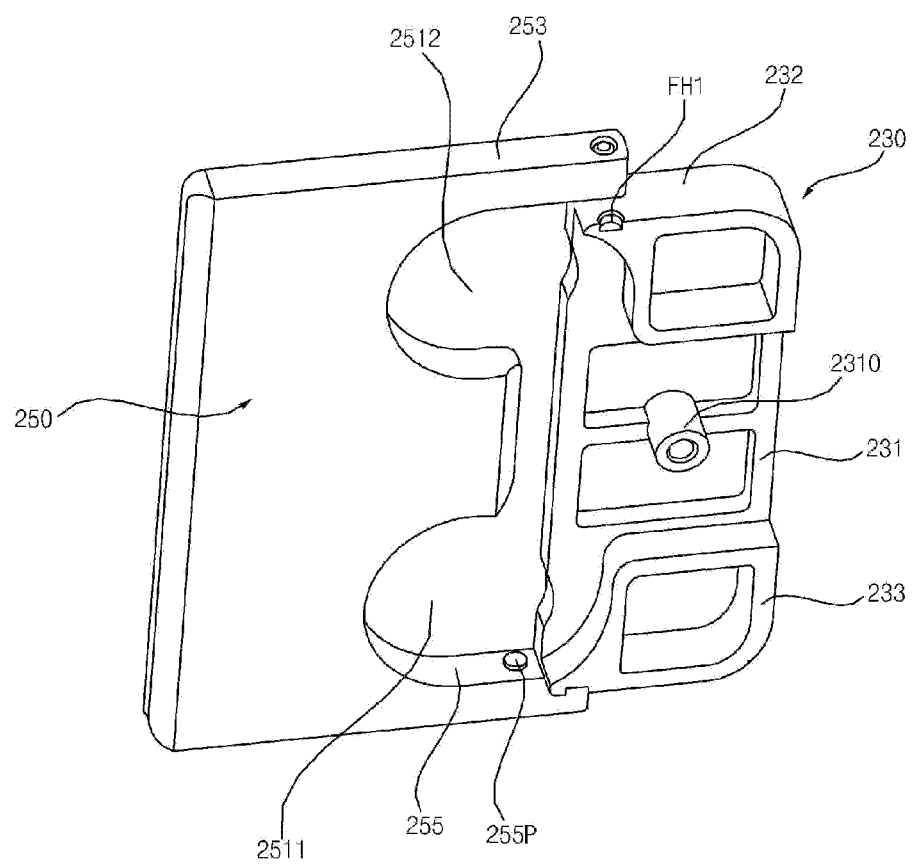

Referring to FIGS. 16 and 17, the bracket 210 may be bent. The bracket 210 may include the first part 211, the second part 213, and the third part 215. The second part 213 may be bent and extend from the first part 211. For example, the second part 213 may form an angle of 90 degrees with respect to the first part 211.

The second part 213 may be bent by being rounded from the first part 211. The third part 215 may extend from the second part 213. The second part 213 may be disposed between the first part 211 and the third part 215.

The bolts B and nuts N may be coupled to the first part 211 through coupling holes. The coupling holes may be formed in the second part 213, and the first part 211 may be omitted. The locking hole H may be formed adjacent to an end of the third part 215.

The sliding slot 2130 may be formed in the second part 213 of the bracket 210. The second part 213 may be bent from the first part 211 to be elongated. The third part 215 may be formed at an end of the second part 213, and the locking hole H may be formed in the third part 215. The sliding slot 2130 may be elongated between the locking hole H and the first part 211 and may be formed through the second part 213. The sliding slot 2130 may be referred to as a guide slot 2130.

The third part 215 of the bracket 210 may include a first extension portion 215a and a second extension portion 215b. The first extension portion 215a may protrude and extend from one corner of the second part 213 or the third part 125. The second extension portion 215b may protrude and extend from another corner of the second part 213 or the third part 215. A first locking hole H may be formed in the first extension portion 215a, and a second locking hole H may be formed in the second extension portion 215b.

The body 230 may include the slider 2310. The slider 2310 may be referred to as a stopper 2310 or a guide protrusion 2310. The slider 2310 may protrude from one surface of the body 230. The slider 2310 may protrude or extend from one surface of the first part 231. The slider 2310 may be disposed between the second part 232 and the third part 233 of the body 230. The slider 2310 may be inserted into the sliding slot 2130 of the bracket 210. The body 230 may move from the first part 211 of the bracket 210 toward the third part 215 thereof, and may move from the third part 215 toward the first part 211. The sliding slot 2130 may limit a movement range of the body 230.

The cover 250 may be pivotally coupled or connected to the body 230. The cover 250 may have a generally plate shape. The cover 250 may include the bridges 253 and 255. A recess may be formed in an outer surface of the cover 250.

The magnet 254 may be inserted into the recess of the cover 250. The magnet 254 and/or the recess may be positioned between the bridges 253 and 255. The magnet 254 and/or the recess may be positioned within a range of the width of the second part 213. For example, a position of the magnet 254 may correspond to the sliding slot 2130. Accordingly, while the cover 252 is fixed to or in contact with the second part 213 of the bracket 210 by a magnetic force, the body 230 may move in the sliding slot 2130. When the cover 250 is fully opened by rotating about the body 230, the cover 250 may be fixed to the second part 213 by the magnetic force.

The cover plate 252 may cover the magnet 254. A size of the cover plate 252 may be greater than a size of the magnet 254. For example, a distance between an upper side and a lower side of the cover plate 252 may correspond to the width of the second part 231 of the bracket 210, or may be smaller than the width of the second part 213. The cover plate 252 may include metal. Accordingly, the magnetic force generated by the magnet 254 acts through the cover plate 252 so that the cover 250 and the second part 213 may be firmly coupled to each other. In other words, as the magnet 254 is disposed at a position corresponding to the sliding slot 2130, a coupling force between the magnet 254 and the second part 213 of the bracket 210 may decrease. The coupling force may increase as the cover plate 252 allows for a wider range of magnetic force.

The cover 250 may have a plate shape. The cover 250 may include a first through hole 2511 and a second through hole 2512. The first through hole 2511 may have a shape corresponding to the first extension portion 215a and may be formed by cutting out the cover 250, and the second through hole 2512 may have a shape corresponding to the second extension portion 215b and may be formed by cutting out the cover 250. When the cover 250 rotates about the body 230, the first extension portion 215a of the bracket 210 may pass through the first through hole 2511 of the cover 250, and the second extension portion 215b of the bracket 210 may pass through the second through hole 2512 of the cover 250.

The body 230 may be disposed between the bridges 253 and 255, and the cover 250 may be coupled to the body 230 by the pin P passing through the bridges 253 and 255. The cover 250 may pivot or rotate about the pin P as an axis.

Figure 18:
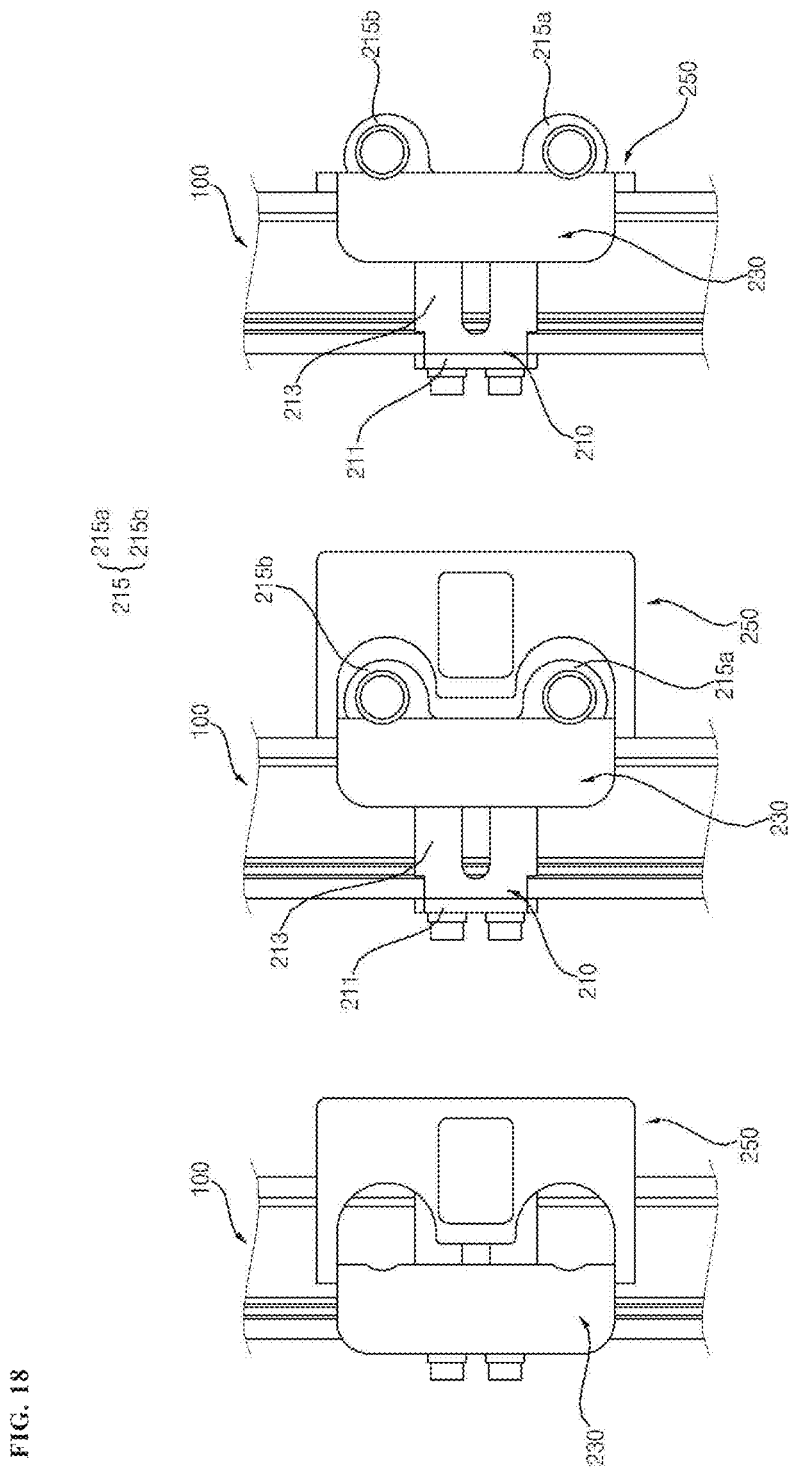

Referring to FIG. 18, the body 230 may move on the bracket 210. The body 230 may move in a longitudinal direction of the second part 213 of the bracket 210. The body 230 may move on a predetermined section of the bracket 210. A movement range of the body 230 may be limited by a length of the slot 2130 (see FIG. 13). While the body 230 moves on the bracket 210, the cover 250 may remain unrotated on the body 230. This may be a state in which the locking device 200 opens the sensor 100.

When the body 230 is close to the first part 211 of the bracket 210, the cover 250 may be parallel to the second part 213 of the bracket 210. In this case, the cover 250 may be coupled to or in contact with the second part 213 of the bracket 210 by a magnetic force. The body 230 may move from front to rear or from left to right on the bracket 250. While the body 230 moves on the bracket 210, the cover 250 may remain coupled to or in contact with the second part 213 of the bracket 210.

When the body 230 moves on the bracket 250 and the body 230 moves closer to the third part 215 of the bracket 210, the cover 250 may rotate about the body 230 to be disposed parallel to the first part 211 of the bracket 210. That is, when the body 230 moves closer to the third part 215 of the bracket 210, the cover 250 may rotate about the body 230.

The cover 250 may rotate about the body 230 as an axis in a clockwise direction and/or counterclockwise direction. The cover 250 may rotate about the body as an axis in both directions. For example, when the body 230 moves closer to the third part 215, the cover 250 may rotate 90 degrees in the counterclockwise direction to cover the front surface of the sensor 100. This may be a state in which the locking device 200 closes the sensor 100.

Accordingly, even when the sensor 100 is installed in a narrow space, the cover 250 may be easily operated.

Referring to FIGS. 1 to 18, a locking device according to an embodiment of the present disclosure includes: a bracket including a first part and a second part bent and extending from the first part; a body coupled to the second part so as to be movable in a longitudinal direction of the second part of the bracket; and a cover pivotally connected to the body, wherein the cover includes: a center plate; and a plurality of bridges which are elongated from the center plate in one direction and include a first bridge extending in the one direction and a second bridge extending in the one direction and spaced apart from the first bridge, wherein the body is disposed between the plurality of bridges, and the plurality of bridges are pivotally connected to the body.

According to another embodiment of the present disclosure, the bracket may include a slot elongated in the longitudinal direction of the second part, wherein the body may include a guide protrusion protruding from the body toward the second part of the bracket and inserted into the slot to move in the slot.

According to another embodiment of the present disclosure, the body may include: a first part; a second part disposed on one side of the first part and connected to the first part; and a third part facing the second part with respect to the first part and connected to the first part, wherein the first bridge may be pivotally connected to one corner of the second part, and the second bridge may be pivotally connected to one corner of the third part which corresponds to the one corner of the second part.

According to another embodiment of the present disclosure, the second part of the body may include: a first side; a third side opposite the first side; a second side connecting the first side and the third side at a position between the first side and the third side; a fourth side opposite the second side and connecting the first side and the third side; a first pin hole located adjacent to a corner formed between the first side and the second side; a first fixing hole located adjacent to a corner formed between the first side and the fourth side; and a second fixing hole located adjacent to a corner formed between the second side and the third side, wherein the cover may include: a pin inserted into the first bridge and the first fixing hole; and a fixing protrusion protruding from the first bridge toward the second bridge, and inserted into or removed from the first fixing hole or the second fixing hole.

According to another embodiment of the present disclosure, the cover may further include a magnet coupled within the center plate.

According to another embodiment of the present disclosure, the cover may further include a cover plate covering the magnet and fixed to a front surface of the center plate, wherein the cover plate may include metal.

According to another embodiment of the present disclosure, the cover plate may be disposed between the first bridge and the second bridge.

According to another embodiment of the present disclosure, the slot may include: a first end formed at one end in a longitudinal direction of the slot adjacent to the first part; and a second end formed at another end in the longitudinal direction of the slot, wherein the guide protrusion moves between the first end and the second end of the slot, and when the guide protrusion is adjacent to or in contact with the second end, the cover may rotate about the body to be disposed parallel to the first part.

According to another embodiment of the present disclosure, the bracket may further include a nut disposed adjacent to an inner surface of the first part, wherein the nut may be fastened to a coupling hole formed in the first part of the bracket.

According to another embodiment of the present disclosure, a sensor assembly includes: a housing having an inner receiving space; a light emitter or a light receiver which are disposed in the inner receiving space; and a cover which is coupled to one surface of the housing and through which light emitted by the light emitter or incident on the light receiver passes, wherein the housing further includes a coupling rail formed on a rear surface, wherein a nut of a locking device is mounted on the coupling rail, and a cover of the locking device covers or opens the cover.

Certain embodiments or other embodiments of the disclosure described above are not mutually exclusive or distinct from each other. Any or all elements of the embodiments of the disclosure described above may be combined with another or combined with each other in configuration or function.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A locking device for a multi-optical axis sensor configured to detect a predetermined area by using a plurality of light sources, the locking device comprising:
   a body:
   a pin protruding from the body; and
   a cover pivotally connected to the body so as to pivot about the pin, wherein the cover comprises:

a center plate; and a plurality of bridges which are elongated from the center plate in one direction and include a first bridge extending in the one direction and a second bridge extending in the one direction and spaced apart from the first bridge, wherein the body further comprises a locking hole formed in a bracket that is integrally formed with the body, wherein the body is disposed between the first bridge and the second bridge, and when the cover faces the body, the cover is fixed to the body by a magnetic force, wherein when the cover covers an optical path of the multi-optical axis sensor, the locking hole protrudes from an outer surface of the cover of the locking device.

2. The locking device of claim 1, wherein the body comprises:

a first part;

a second part disposed on one side of the first part and connected to the first part; and a third part facing the second part with respect to the first part and connected to the first part, wherein a distance between the first bridge and the second bridge corresponds to a distance between an outer surface of the second part of the body and an outer surface of the third part thereof.

3. The locking device of claim 1, further comprising:

a bracket having a coupling hole and integrally formed with the body; and a bolt coupled to the coupling hole of the bracket.

4. The locking device of claim 3, further comprising a nut fastened to the bracket and contacting the bolt, wherein the bolt is rotated to be coupled to the nut.

5. A sensor assembly comprising a sensor and a locking device coupled to the sensor, wherein the sensor comprises:

an emitter configured to provide light, and a receiver configured to detect the light provided by the emitter, wherein the emitter comprises:

an emitter housing elongated and having an inner receiving space;

a light emitter disposed in the inner receiving space of the emitter housing in a longitudinal direction of the emitter housing; and an emitter transparent cover which is coupled to one surface of the emitter housing and through which light emitted by the light emitter passes, wherein the receiver comprises:

a receiver housing elongated and having an inner receiving space;

a light receiver disposed in the inner receiving space of the receiver housing in a longitudinal direction of the receiver housing, and corresponding to the light emitter of the emitter; and a receiver transparent cover which is coupled to one surface of the receiver housing and through which light incident on the light receiver passes, wherein the locking device comprises:

a body;

a pin protruding from the body;

a cover pivotally connected to the body so as to pivot about the pin, and fixed to the body by a magnetic force when facing the body; and a locking hole formed in a bracket that is integrally formed with the body, wherein the cover comprises:

a center plate; and a plurality of bridges which are elongated from the center plate in one direction and include a first bridge extending in the one direction and a second bridge extending in the one direction and spaced apart from the first bridge, wherein the body is disposed between the first bridge and the second bridge, wherein when the cover of the locking device covers the transparent cover of the emitter housing or the transparent cover of the receiver housing, the locking hole protrudes from an outer surface of the cover of the locking device.

6. The sensor assembly of claim 5, wherein the locking device comprises:

a bracket having a coupling hole and integrally formed with the body;

a bolt coupled to the coupling hole of the bracket; and a nut fastened to the bracket and contacting the bolt.

7. The sensor assembly of claim 6, wherein the housing further comprises a coupling rail formed on another surface of the housing, wherein:

the nut of the locking device is mounted on the coupling rail; and the cover of the locking device covers or opens the transparent cover.

8. The sensor assembly of claim 7, wherein the cover of the locking device further comprises a wall extending from an end, wherein when the cover of the locking device covers the transparent cover, the wall covers a corner of the housing that is adjacent to the transparent cover.

9. The sensor assembly of claim 7, wherein coupling between the nut of the locking device and the coupling rail of the housing increases by rotation of the bolt.

* * * * *